Patented Mar. 7, 1939

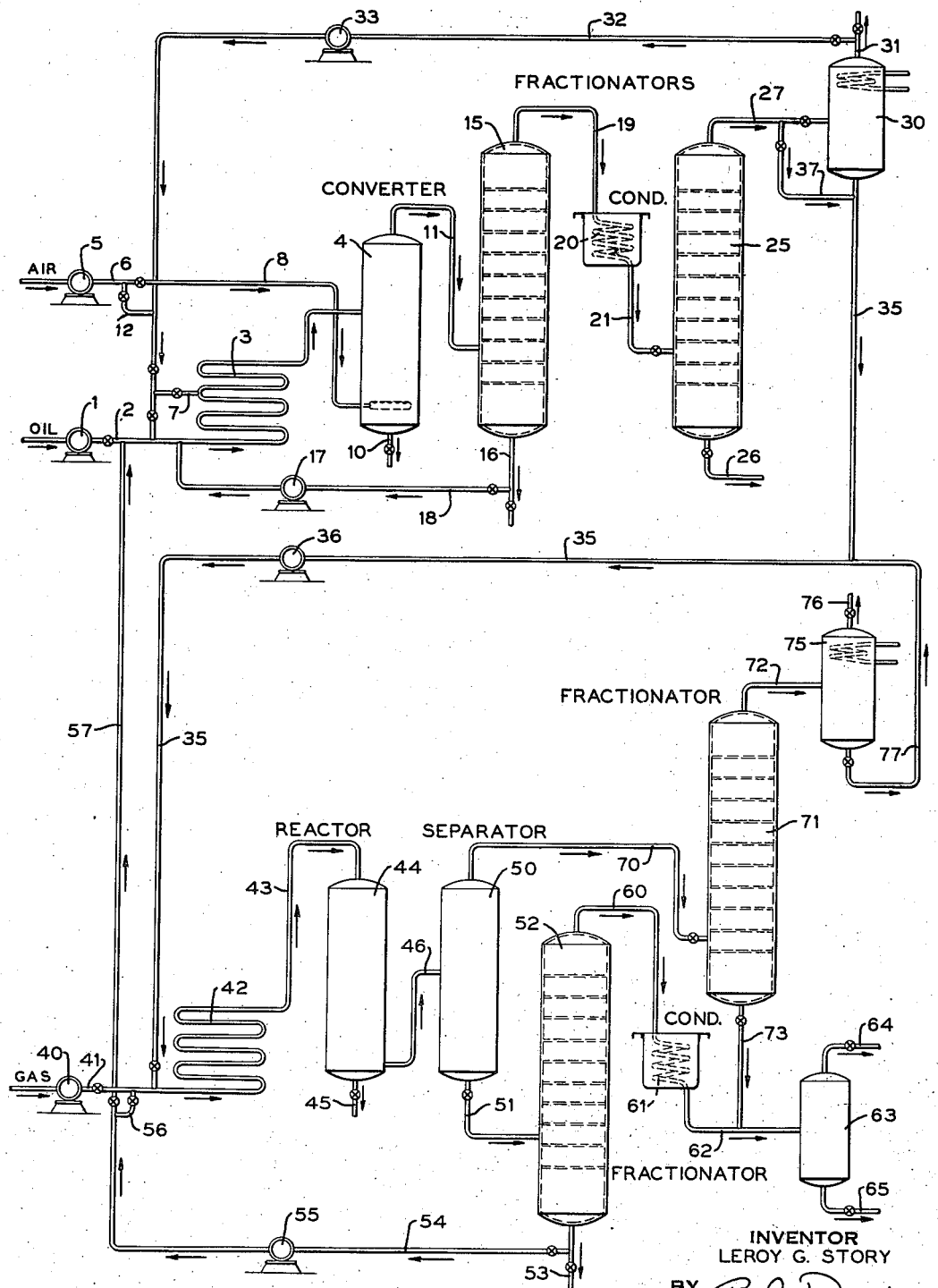

2,149,800

UNITED STATES PATENT OFFICE 2,149,800

CONVERSION OF HYDROCARBON OILS AND GASES

Le Roy G. Story, Bronxville, N. Y., assignor to The Texas Company, New York, N. Y., a corporation of Delaware Application July 23, 1936, Serial No. 92,074

2 Claims. (Cl. 196—10)

This invention relates to the manufacture of motor fuel and has to do particularly with the conversion of hydrocarbon oils and gases into liquid products comprising gasoline.

The invention contemplates the conversion of higher boiling hydrocarbon oils into lower boiling products and the subjection of a fraction of the lower boiling products, which is particularly suitable for polymerization, to polymerization conditions of temperature and pressure, to produce liquid products of the nature of gasoline. More specifically, the invention is concerned with the conversion of hydrocarbon oils in such a manner as to produce gaseous polymerizable products which are not only readily polymerizable but also are particularly adapted for mixture with other gaseous hydrocarbons which are subjected to a polymerization operation to improve the formation of liquid products therefrom.

In a specific embodiment of the invention, hydrocarbon oils are subjected to conversion under conditions of controlled oxidation, whereby lower boiling products are formed and a normally gaseous fraction is separated from the products of conversion and the latter conducted to a polymerization operation. In is intended that the conversion of the hydrocarbon oils should be conducted in such a manner that the low boiling fraction subjected to polymerization is especially valuable for polymerization into liquid products and for promoting the polymerization of gaseous hydrocarbons which are normally subjected to polymerization operations. The invention is not limited to any particular theory of reaction but it is believed that the conversion of the hydrocarbon oils by the aid of oxidation produces in the low boiling products materials which catalyze or accelerate the polymerization of hydrocarbon gases. By conducting a conversion operation with the aid of partial oxidation and simultaneously conducting a gas polymerization operation and conducting catalytic materials from the conversion operation to the polymerization operation, the full benefits of the present invention are realized.

The conversion operation may be conducted in a number of ways and I have found, in general, whenever the conversion operation is conducted so as to obtain partial oxidation of the oil undergoing conversion, beneficial results of the process of the invention are obtained. The first operation is ordinarily conducted by raising the oil to a temperature to which active oxidation is initiated. This temperature is usually around 350–700° F., although higher temperatures within the cracking range, for example 750–1050° F., may be used, with the oxidation controlled so that extensive combustion of the oil to water and carbon dioxide is avoided. According to one method of operation, heavy hydrocarbon oil or residuum may be raised to a temperature of around 400–500° F. and then discharged into a converter wherein the oil is subjected to oxidation to convert the oil into lower boiling products. The oxidation may be accomplished by the addition of oxygen, or air, or other oxygen-containing gas, and introduced at such a rate as to maintain a suitable temperature throughout the conversion of the oil. It is possible by such an operation to convert the oil into low boiling products consisting largely of gas oil, gasoline and uncondensable gases, fuel oil and coke, as desired. If the operation is carried out as a coking process, coke, gas oil and a small amount of gasoline and a considerable proportion of gas, are formed. A pressure of 50–150 or more lbs. may be used. In such an operation, 5–10% of coke, and 50–80% of gas oil, 5–20% gasoline, and 5–20%, more or less, or gas can be obtained.

According to another method of operation, I may conduct the process so that more extensive cracking is accomplished. For example, a cracking stock such as gas oil or other suitable cracking material may be heated to incipient cracking, and then contacted with the oxidizing agent to obtain rather extensive conversion. The temperature and pressure conditions may be those ordinarily employed in cracking operations, for example 200–800 lbs. pressure and about 750–1000° F. In this latter type of operation, a gas oil or recycle stock which may be recirculated to the system, an adequate yield of gasoline and gaseous products adapted for polymerization are obtained. I may use enough of the oxidizing agent to maintain conversion conditions, such as 5–10 cubic feet of active oxidizing gas per gallon of oil, or larger amounts of oxidizing agent bordering on an excess, such as 10–30 cubic feet per gallon of oil.

In some cases it is particularly advantageous to use as low temperatures as possible and larger amounts of the oxidation agent than commonly used heretofore and which normally would be considered an excess, and controlling the conversion conditions so that relatively large amounts of gaseous products are obtained. In the latter instance, it is advantageous to recirculate the more volatile of the gaseous products, which may contain an active oxidizing agent, to the system, although in some cases these more volatile products contain polymerization catalyzers which are very desirable for charging to the polymerization operation.

The method of conducting the polymerization depends considerably on the nature of the preceding oil-conversion step. The gas conversion operation may satisfactorily be carried out according to well known polymerization conditions of temperature and pressure, such as commonly used for conversion of hydrocarbons such as butane, propane, etc. These conditions in general are temperatures around 700–1200° F. and pressures of about 500–2000 lbs. The latter conditions are those commonly used in thermal polymerization processes in which the present invention is adapted for general application. However, in case olefin gases are desired to be converted, the polymerization operation is well suited to be carried out with the aid of a suitable catalyst, of which a number are well known in the art, and of course the temperature and pressure conditions would be considerably lower, for example temperatures of around 400–600° F. and pressures of about 300–600 lbs. In some instances the self-generated catalytic materials may be sufficient so that an extraneous catalyst will be unnecessary. In case gases charged to the polymerization operation are predominantly those from an oil conversion process and relatively high in olefinic content, a catalytic conversion operation is preferred. However, I may conduct the polymerization operation as a thermal process and in the latter instance, considerable amounts of fresh charge gases, such as gases high in propane and butane content, or refinery gases relatively low in unsaturation, may be charged to the system. It is intended that sufficient of these fresh charging stocks be added to the recirculated gases to maintain a suitable volume of charge to the system at all times. Ordinarily the gases from the conversion system will constitute about 20–50% of the gases charged to the polymerization operation.

In order to illustrate the invention more fully, reference will now be made to the accompanying drawing which is semi-diagrammatical and shows a view in elevation of one form of apparatus for carrying out the process of the invention.

Referring to the drawing, oil may be drawn by the pump 1 from a suitable source of supply, not shown, and charged through the valve controlled line 2 to a heating coil 3, wherein the oil is heated to the desired temperature and then discharged into the converter 4. Air or other oxidizing gas is charged by the pump 5 through the valve controlled line 6 and mixed with the charge entering the coil by means of the line 12, or discharged into the coil at a point mid-way thereof through the branch line 7, or through the branch line 8 directly into the converter where it is contacted with the oil by the distributor 9. The pipe 10 leading from the bottom of the converter represents either a line for withdrawing liquid tarry products or other means, such as a manhole for removing coke. The vapors from the converter are drawn from the top of the converter through the line 11 and discharged into the fractionator 15. A re-cycle stock collecting in the bottom of the fractionator may be withdrawn through the line 16 and discharged from the system or recirculated to the heating coil 3 by the pump 17 located in the valve controlled line 18. Lighter products, usually comprising gasoline and uncondensable gases, are withdrawn from the top of the fractionator through the line 19 in which is located a condenser 20. The condensate and uncondensed vapors and gases from the condenser are conducted by the pipe 21 to fractionator or stabilizer 25. In the fractionator 25 substantially all the products suitable for gasoline manufacture are condensed and withdrawn from the bottom thereof, through the line 26. The lighter products, comprising olefins and paraffins and oxygenated compounds, having not over about four carbon atoms, are withdrawn from the top of the fractionator through the line 27, and conducted to auxiliary fractionator 30. In the latter fractionator, the lightest materials, such as hydrogen, methane and oxygen gases, are separated and discharged through the line 31 or recirculated to the system through the line 32, by the pump 33. The intermediate light products, comprising olefins, paraffins, and oxygenated compounds, are withdrawn from the separator 30, through the line 35, by the pump 36 and conducted to the gas polymerization system. In some instances, it is advantageous to by-pass the fractionator 30 by means of line 37 and pass all the light products to the polymerization operation.

In addition to the gaseous products from the oil conversion operation charged from the line 35, lighter gases are drawn from a suitable source of supply, not shown, by the pump 40 and forced through the valve line 41 to the heating coil 42, wherein this fresh charge and the oil conversion gases are mixed and heated to conversion temperatures. The mixture so heated is conducted from heating coil 42, through the line 43, to the reactor 44, from which tar or other liquids formed in the polymerization reaction may be withdrawn from the bottom thereof, through the pipe 45. The polymerization products are conducted from the reactor through the line 46, to a separator 50, wherein partial separation of liquefiable constituents is effected. Heavier liquid products condensed in the separator are withdrawn from the bottom thereof, through the valve line 51, to a fractionator 52. In this fractionator the gasoline constituents are separated from the heavier products, such as gas oil, fuel oil and tars. The latter products are withdrawn from the bottom of the fractionator by line 53 and discharged from the system or recycled through line 54, by the pump 55, and introduced through by-pass line 56 into the gaseous products charged to the heating coil 42, or conducted through the line 57 to the heating coil 3 of the oil conversion system. The gasoline constituents separated in the fractionator 52 are withdrawn from the top thereof, through the line 60 and condenser 61 and run-down line 62 to the storage tank 63 which is equipped with gas release pipe 64 and liquid draw-off line 65. The light constituents uncondensed in the separator 50 are withdrawn from the upper portion thereof through the valve controlled line 70 to the fractionator 71 in which the remaining gasoline constituents are condensed and withdrawn from the bottom thereof through the line 73 to the storage tank 63, referred to heretofore. The constituents lighter than gasoline are conducted from the top of the fractionator 71, through the vapor line 72 to the auxiliary fractionator 75, wherein the lightest constituents, such as hydrogen and methane, are separated and released through the valve line 76, while constituents intermediate between the gasoline and those gases released through the line 76 are withdrawn through the line 77 and recycled to the system through the line 35, by means of pump 36, referred to heretofore.

As an example of the invention, a charging stock such as a heavy reduced crude is heated to about 600° F. and mixed with air. The temperature is controlled so as to produce a minimum amount of coke and maximum amount of gases and a minor proportion of gasoline. An excess of air may be used providing the temperature is maintained sufficiently low and the pressure maintained so that vaporization is effected. For example, a pressure of around 50–100 lbs., a maximum temperature of about 850° F., and a ratio of air of about 60–100 cubic feet per gallon of oil may be maintained. About 15% coke, 70% gas oil, 5% gasoline and 10% hydrocarbon gases are produced. Approximately 80% of these hydrocarbon gases, substantially free from hydrogen and oxygen, are conducted to a gas polymerization operation wherein they are mixed with about 50–75% fresh charge, consisting mainly of butane and propane. The mixture is heated to around 1050° F. and under pressure of approximately 750 lbs. By recycling the unpolymerized gases, a yield of about 12 gallons or more per 1000 cubic feet of charged gas is obtained.

The process of the present invention gives a high ultimate yield of motor fuel products when the gas oil produced in the system is subjected to cracking. The gasoline produced both in the primary conversion operation and in the secondary gas polymerization operation, furthermore, shows a high antiknock value, either as a straight gasoline or as a blending fluid. The process is of particular advantage because it utilizes the gaseous products in an advantageous manner to produce gasoline and is a means for improving the operation of a gas polymerization system.

Obviously many modifications and variations of the invention, as hereinbefore set forth, may be made without departing from the spirit and scope thereof, and therefore only such limitations should be imposed as are indicated in the appended claims.

I claim:

1. A process for the conversion of high boiling hydrocarbons into low boiling motor fuel hydrocarbons of the class of gasoline, which comprises subjecting the oil to conversion in the presence of oxygen whereby a larger amount of polymerizable gaseous products is formed than is produced by thermal cracking said oil in the absence of said oxygen, said products comprising a large proportion of the oxygenated and unsaturated hydrocarbons, separating and subjecting said products to a polymerization operation and recovering from the reaction products normally liquid products of high antiknock value and suitable for the manufacture of gasoline.

2. A process for the conversion of high boiling hydrocarbon oils into lower boiling motor fuel hydrocarbons of the class of gasoline, which comprises subjecting the oil to conversion in the presence of oxygen and oxygenated gases, whereby a large amount of gaseous products is formed, separating said gaseous products into a lighter fraction containing said oxygenated gases and a heavier fraction, recycling said lighter fraction to the conversion operation to promote said conversion and subjecting said heavier fraction to polymerization whereby gasoline hydrocarbons are formed.

LE ROY G. STORY.